(12) United States Patent
Stepper

(10) Patent No.: US 7,222,840 B1
(45) Date of Patent: May 29, 2007

(54) ROPE-GUIDING DEVICE

(76) Inventor: Orval O. Stepper, 255 NE. Gerlinger Ln., Dallas, OR (US) 97338

( * ) Notice: Subject to any disclaimer, the term of this patent is extended or adjusted under 35 U.S.C. 154(b) by 0 days.

(21) Appl. No.: 11/432,806

(22) Filed: May 11, 2006

Related U.S. Application Data

(63) Continuation-in-part of application No. 11/277,038, filed on Mar. 21, 2006, now abandoned.

(51) Int. Cl.
*B66D 3/04* (2006.01)
(52) U.S. Cl. .................. 254/391; 254/405
(58) Field of Classification Search ........ 254/390–394, 254/401, 402, 405, 408, 409, 411, 414, 415, 254/334, 335
See application file for complete search history.

(56) References Cited

U.S. PATENT DOCUMENTS

| | | | |
|---|---|---|---|
| 916,091 A * | 3/1909 | Batzer ................... | 188/64 |
| 2,638,184 A * | 5/1953 | Sturdivant ............... | 188/64 |
| 4,165,830 A * | 8/1979 | Svendsen ................ | 226/187 |
| 4,354,667 A * | 10/1982 | Svendsen ................ | 254/332 |
| 4,511,122 A * | 4/1985 | Svendsen ................ | 254/332 |
| 4,521,000 A * | 6/1985 | Dodge, Jr. ............... | 254/391 |
| 5,249,543 A * | 10/1993 | Rutgerson et al. ......... | 114/108 |
| 5,638,919 A * | 6/1997 | Pejout ................... | 182/192 |
| 5,845,894 A * | 12/1998 | Petzl et al. .............. | 254/391 |
| 5,860,493 A * | 1/1999 | Cherpitel ................ | 188/65.2 |
| 6,685,171 B2 * | 2/2004 | Lob et al. ............... | 254/391 |

\* cited by examiner

*Primary Examiner*—Gene O. Crawford
*Assistant Examiner*—Evan H. Langdon
(74) *Attorney, Agent, or Firm*—Peter A. Haas Esquire LLC; Peter A. Haas

(57) ABSTRACT

A rope-guide device suitable for marine use as a crab-pot puller, an anchor puller, a shrimp-pot hauler, and the like includes an arcuate, side-entry slot running the entire vertical length of its cylindrical body. A unique lock-mechanism prevents rope slippage by crimping the rope between the interior wall of the body and a tongue-like locking mechanism with a positive-tension device. An optional handle, which protrudes exterior of the body and extends interior the body, resting against the locking mechanism, assists release by a user-activated motion on the handle.

5 Claims, 7 Drawing Sheets

ROPE-GUIDING DEVICE

This application is a continuation-in-part of U.S. patent application Ser. No. 11/277,038 titled "Rope-guiding Device" filed on 21 Mar. 2006.

BACKGROUND

The present invention relates to a device for guiding a rope or line in a marine environment, and more particularly to an anchor or pot puller.

The commercial fishing industry employs crab pots of various designs and material to capture live crabs from the floor of the ocean, bay, or inlet, for example. Typically, a rope (or line or cord) extends from the crab pot to a marker buoy. The marker buoy may bob on the surface of the water, or may be submersed and include a release mechanism that will release the buoy to the surface under particular conditions, such as a timed release or a radio-frequency release operated by a fisherman.

Crab pots rest on the ocean floor, enticing live crabs inside using bait. Once one or several crabs enter the pot, they are unable to escape. Fishermen leave unattended several crab pots on the ocean floor. Periodically, the fishing vessel returns to the buoy attached to the corresponding crab pot and a fisherman connects the line extending from the pot to a pulling device, such as a hand winch or motorized winch, via a pulley block mounted on the vessel; thus affecting retrieval of the pot from the ocean floor. Because one end of the rope affixes to the crab pot, and the second end attaches to a ring for such purposes on the buoy, the fisherman typically untied the knot at the second end, removing the buoy, and attached the second end to the pulling device.

To expedite and otherwise increase efficiency of this operation an assist device, called a pot-puller or pot-hauler, attaches to a buoy and the rope feeds through the pot-puller. The pot-puller includes a mounting means for attaching to the buoy. Typically, the mounting means consists of an eyelet wherethrough a short line, quick-link, or bolt-and-nut assembly passes and links the pot-puller to the ring on the buoy. The pot-puller includes a locking mechanism to retain the rope in a fixed position, preventing unintentional slippage and loss of the crab pot. Thus, the rope extending to the crab pot firmly affixes to the buoy and frees the second end to be quickly attached to the pulling device on the fishing vessel as needed.

The typical, prior-art pot-puller consists of a material suitable for the corrosive marine environment. Common materials include cast or machined aluminum, brass, or stainless steel. The prior-art pot-pullers typically consist of a unitary body and a locking mechanism. The unitary body includes a mounting means, such as an eyelet, for attaching the pot-puller to a buoy. Generally, pot-pullers of the prior-art are formed from a unitary piece in a cylindrical configuration with a vertically aligned, central through-hole sized to pass the crab-pot rope. The locking-mechanism typically consist of an inclined slot wherethrough a float-pin rests. A properly inserted crab-pot rope will easily slide in one direction as the float-pin moves in a corresponding direction within the confines of the inclined slot. But, an attempt to pull the rope in the opposite direction the float-pin will resist against the rope, pinching the rope between the pin and the interior wall of the unitary body. This design enables a crab-pot to be retrieved quickly from the ocean floor and prevents the rope from accidentally releasing from the buoy when unattended.

The prior-art crab pot-puller presents two significant obstacles to the fishing industry. First, the through-hole design requires feeding the crab-pot rope through the two open ends, which are the only openings suitably sized to pass a rope. This necessitates either hauling up the crab-pot, detaching the line from the pot and then running the first rope end through the pot-puller or running the rope all the way out to get to the second end of the rope. This makes repair or retrofitting awkward and costly. Second, the locking mechanism requires two-handed manipulation to play-out the crab rope. This technique is awkward and cumbersome, as it is not always possible to employ both hands as the vessel rolls and pitches with the ocean's swell.

SUMMARY OF THE INVENTION

The present invention overcomes the obstacles of the prior-art and provides an improved locking mechanism and structure to improve the rope-feeding characteristics of a pot-puller. The present invention, however, is not limited to crab-pot pullers. It easily adapts to any situation where retaining a rope in a fixed position and subsequent rapid feeding of the rope is desired. For example, the present invention may be used with anchor lines, trotlines, and other rigging. The present invention is also suited for non-marine applications such as a load-securing rope guide and tensioner, for example.

In a preferred embodiment, the present invention comprises a rope-guiding device for a rope. The device comprises a body member comprising at least one sidewall forming an interior portion having an open body first end and an oppositely arranged open body second end and the sidewall further comprising a slot extending from the first end to the second end, the slot being adapted to receive the rope; a locking mechanism extending from a first interior portion of the sidewall, the locking mechanism being adapted to releaseably engage the rope; and a retaining element extending from a second interior portion of the sidewall, the retaining element being adapted to releaseably engage the rope.

Embellishments to the device of the preferred embodiment include a means for selectively coupling the body to a cord.

The rope-guiding device further comprises an anti-reversing lock lever handle adapted to releasably engage the lock mechanism and extending through the body member to an exterior portion of the body member.

The rope-guiding device further comprises a roll-pin assembly arranged at the body first end and adapted to slideably support the rope.

The rope-guiding device further comprises a second roll-pin assembly arranged at the body second end and adapted to slideably support the rope.

The slot further comprises a generally arcuate profile.

The body member further comprises a generally barrel-shaped, hollow cylinder.

In another embodiment of the present invention a rope-guiding device comprises a body member comprising at least one sidewall, the sidewall having a slot extending from a body first end to a body second end, the slot being adapted to receive a rope. Additionally, the rope-guiding device further comprises a locking mechanism extending from a first interior portion of the sidewall, the locking mechanism being adapted to releaseably engage the rope.

In yet another embodiment, the present invention includes a rope-guiding device comprising a body member comprising at least one sidewall, the sidewall having a slot extending from a body first end to a body second end, the slot being adapted to receive a rope; a locking mechanism extending from a first interior portion of the sidewall, the locking mechanism being adapted to releaseably engage the rope; a first retaining element extending from a second interior portion of the sidewall and being adjacent to the body first end, the retaining element being adapted to releaseably engage the rope; and a second retaining element extending from a third interior portion of the sidewall and being adjacent to the body second end.

Further, the rope-guiding device includes a means for selectively coupling the body to a cord.

The rope-guiding device further comprises an anti-reversing lock lever handle adapted to releasably engage the lock mechanism and extending through the body member to an exterior portion of the body member.

The rope-guiding device further comprises a roll-pin assembly arranged at the body first end and adapted to slideably support the rope.

The rope-guiding device further comprises a second roll-pin assembly arranged at the body second end and adapted to slideably support the rope.

The slot further comprises a generally arcuate profile and the body member further comprises a generally barrel-shaped, hollow cylinder.

DRAWING

DESCRIPTION OF THE INVENTION

Figure 1:
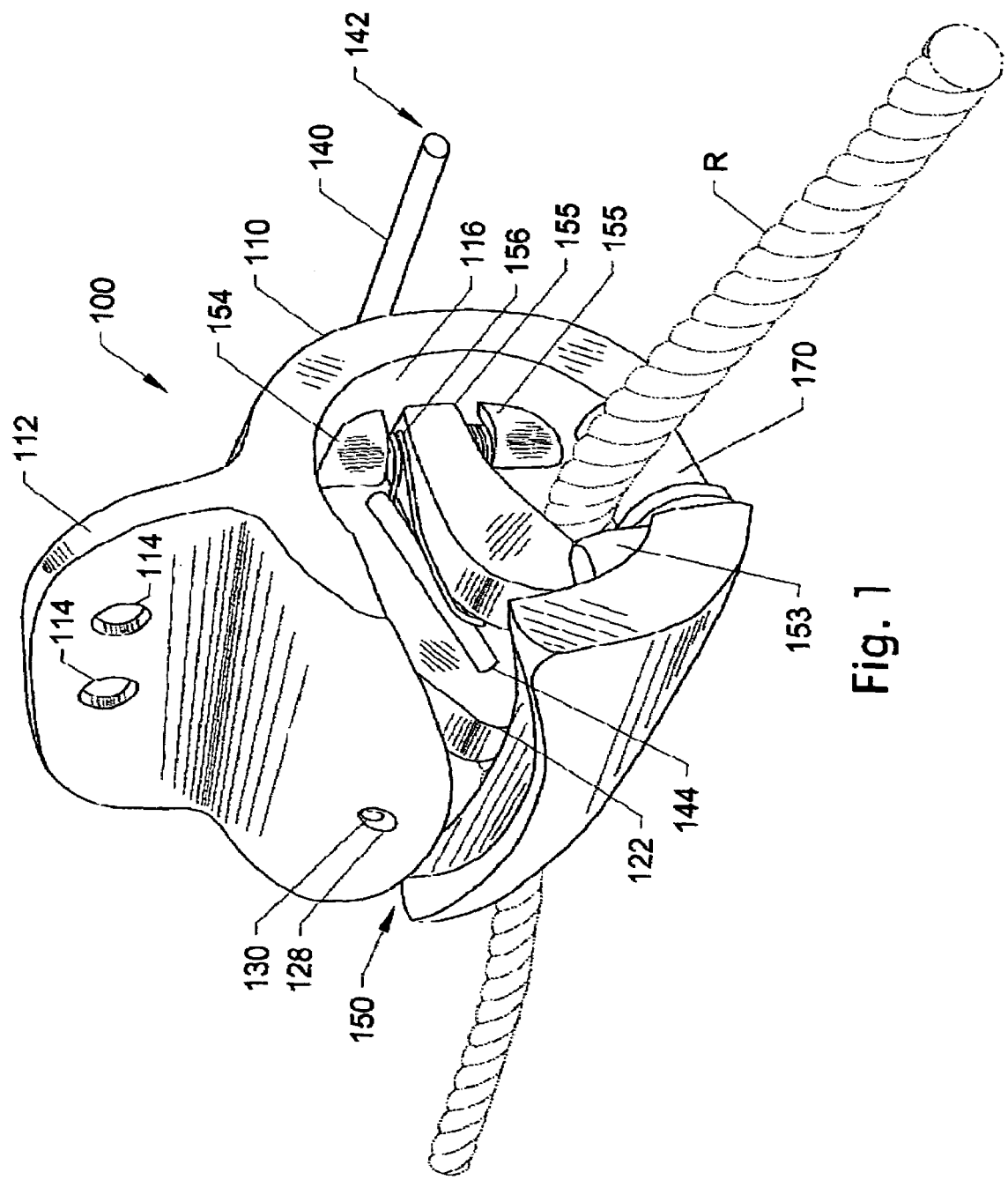
FIG. 1 is an offset front profile view of one embodiment according to the present invention.
Figure 2:
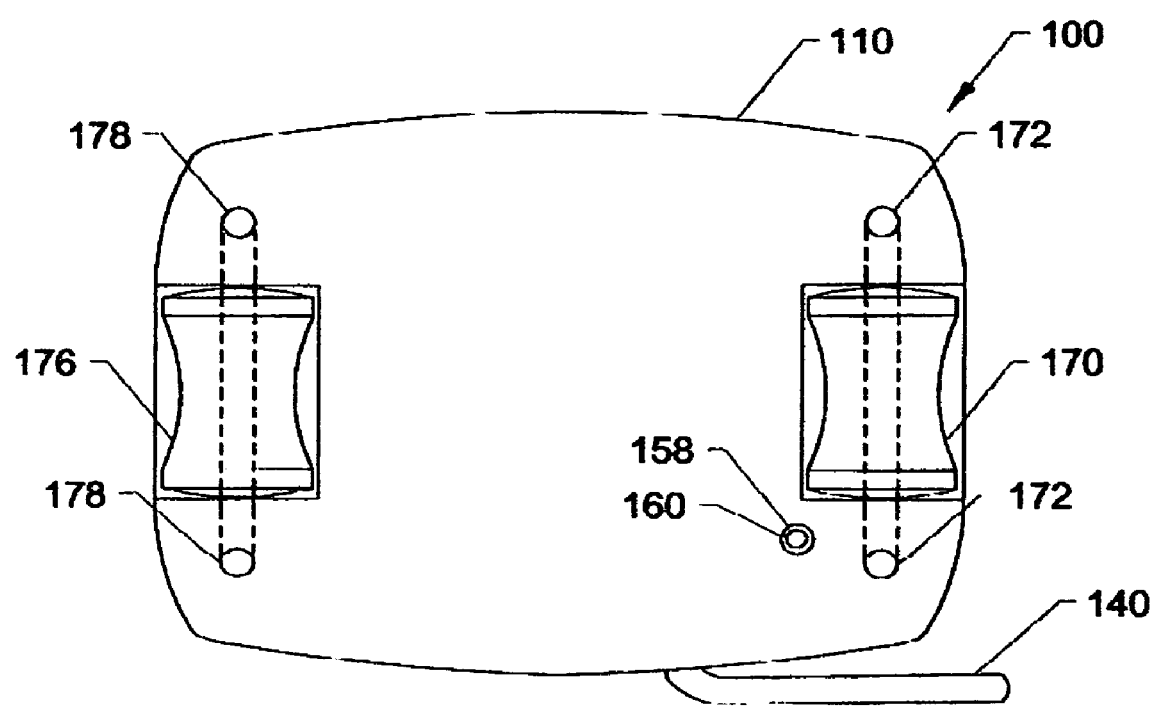
FIG. 2 is a top view of the embodiment of FIG. 1.
Figure 3:
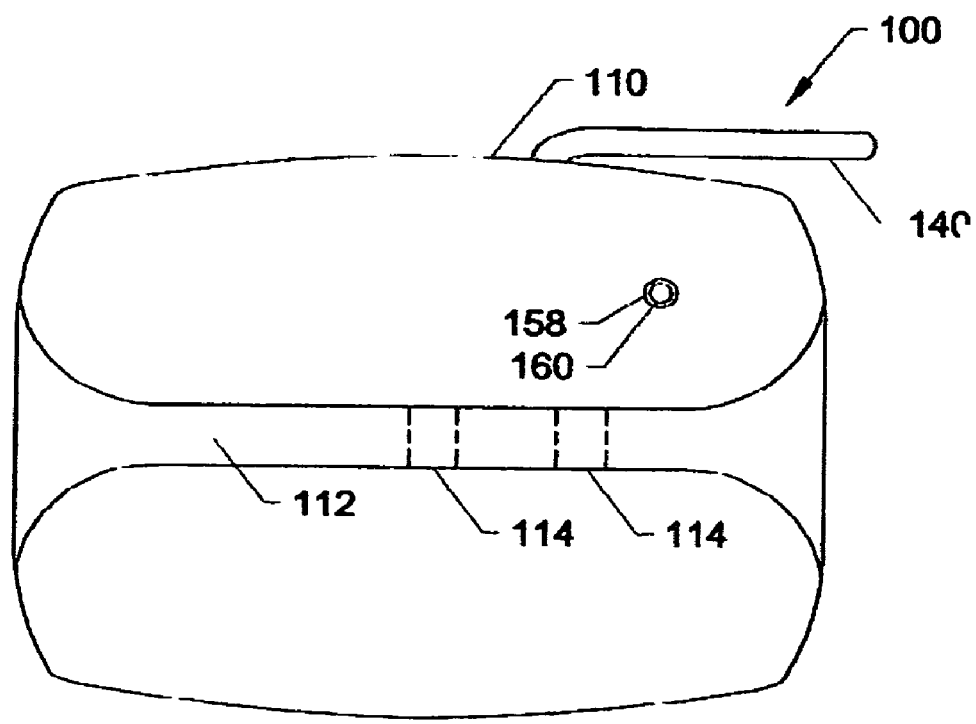
FIG. 3 is a front view of another embodiment of the present invention.
Figure 12:
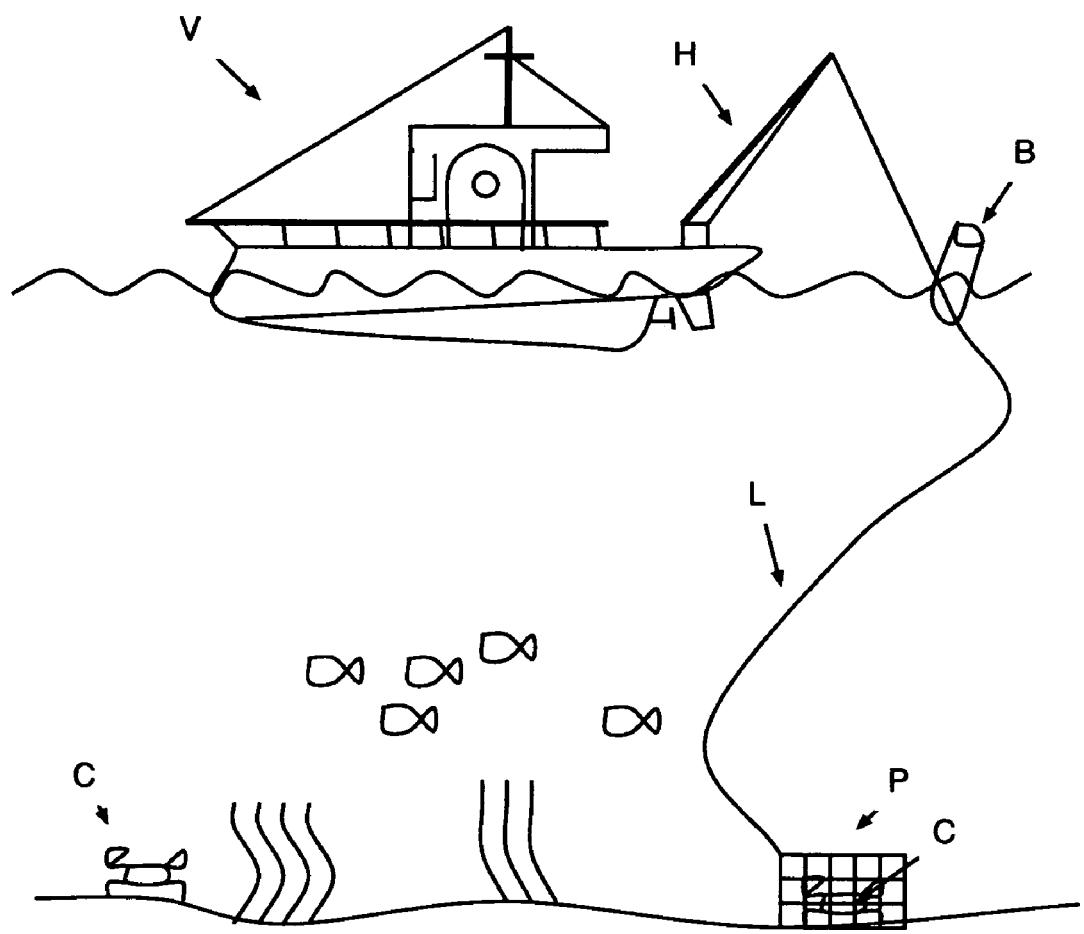
FIG. 12 illustrates one possible environment of the present invention.

The present invention relates to a rope-guide device. In one exemplary embodiment, as FIG. 12 illustrates, the present invention relates to a rope-guide device referred to as an pot-puller 100 (of FIG. 1, for example) (alternatively, the device may be referred to as an EZ-pot-puller, Orval's EZ Pull™, or as Orval's EZ Pull™ brand pot puller) and improves upon known prior-art pot-pullers in the sport or commercial fishing industry and is suitable for use as a crab pot-puller, a shrimp pot-puller, or an anchor puller, for example. As FIG. 12 illustrates, an unattended crab pot P rests on the bottom surface of an ocean, bay, or the like and entices crabs C into the pot by means well understood by those having ordinary skill in the art. A line L attaches to the pot P, connecting the pot P to a surface-floating, marker buoy B. During harvest of the crab-pots, a fisherman grabs hold of the line L at the marker buoy B and attaches the line to a cleat on the boat, pulling the buoy B onboard. Next, a pot puller 100, such as Orval's EZ Pull™, attaches to large crab-pot buoy by means well understood in the art, for example to a buoy ring. The crab-pot rope (or line) inserts in the put-puller and the combination of puller 100 and crab-pot buoy are tossed overboard. As the boat moves away from the crab-pot buoy, the line becomes taut and the crab-pot P pulls to the surface aided by the positive buoyancy of the crab-pot buoy.

In the appended figures, similar items are referenced by a common reference numeral. Exemplary embodiments of the present invention are described in conjunction with the appended FIGS. 1-12. In one embodiment of the present invention, a rope-guide device or pot-puller 100 comprises a generally hollow-cylindrical body 110 having a vertically aligned fin 112 tapering from the exterior cylindrical body. The fin 112 includes one or more eyelets 114 adapted to receive attaching means, for example, a length of line, a quick-link, a bolt, or any other appropriate attaching device for connecting the EZ pot puller to another structure, for example, a buoy ring.

The hollow interior of the body 110 presents a through-hole of a suitable diameter to pass a rope and the body 110 is dimensioned with sufficient clearance to easily thread the rope through. A locking mechanism mounts on a portion of the interior wall 116. The locking mechanism includes an anti-reversing lock lever 122 having a rope-engaging end 124 and an oppositely spaced pivot end 126. The pivot end includes a pin-receiving through bore 128 (shown in FIGS. 4 and 5) adapted to slideably and rotatably receive a roll pin 130 (illustrated in FIGS. 7 and 8). A tension device 132 exerts pressure on the lever 122, forcing it in a normally closed position, resting a portion of the rope-engaging end 124 to abut against the interior wall 116.

A portion of the interior wall 116 includes a pair of protruding shoulders 118, 119, which are adapted to slideably and rotatably receive the pin 130 and allow clearance for a portion of the pivot end 126 of the lock lever 122. The tension device 132, for example a clip-type spring, positions on the pin 130 and to maintain engaging pressure on the lever 122.

FIGS. 2-7 show the optional release-assist handle 140 extending exterior to the body 110 at a first, user-end 142 and protruding inside the body at a point on the interior wall. The assist handle 140, along a portion of the second lever end 144 selectively contacts a portion of the anti-reversing lock lever 122. Thus, the user may selectively actuate the handle to affect corresponding movement of the anti-reversing lock lever 122 enabling release of the lever. The release-assist handle may be oriented to enable either left-handed or right-handed use.

In another embodiment of the present invention a roller element 170 (and optionally, oppositely placed roller 176) positions adjacent to a first open end of the body. In this way, the roller element 170 acts as a rolling rope support to reduce fatigue on the line as it passes through the pot-puller 100. The roller element includes a support pin 174 (and optionally, oppositely placed roller pin 178) that permits rotation along an axis perpendicular to the line of travel of the rope as it passes through the put-puller.

An optional roll pin inserts in the body 110 and acts as a stop for the anti-reversing lock lever 122. This optional pin may compensate for imprecise tolerances of the body and lever preventing over-travel of the lever to securely fix the inserted line against interior wall of the body 110. Preferably, a stop cast feature in the body is used, and therefore roll-pins may be omitted.

Figure 5:
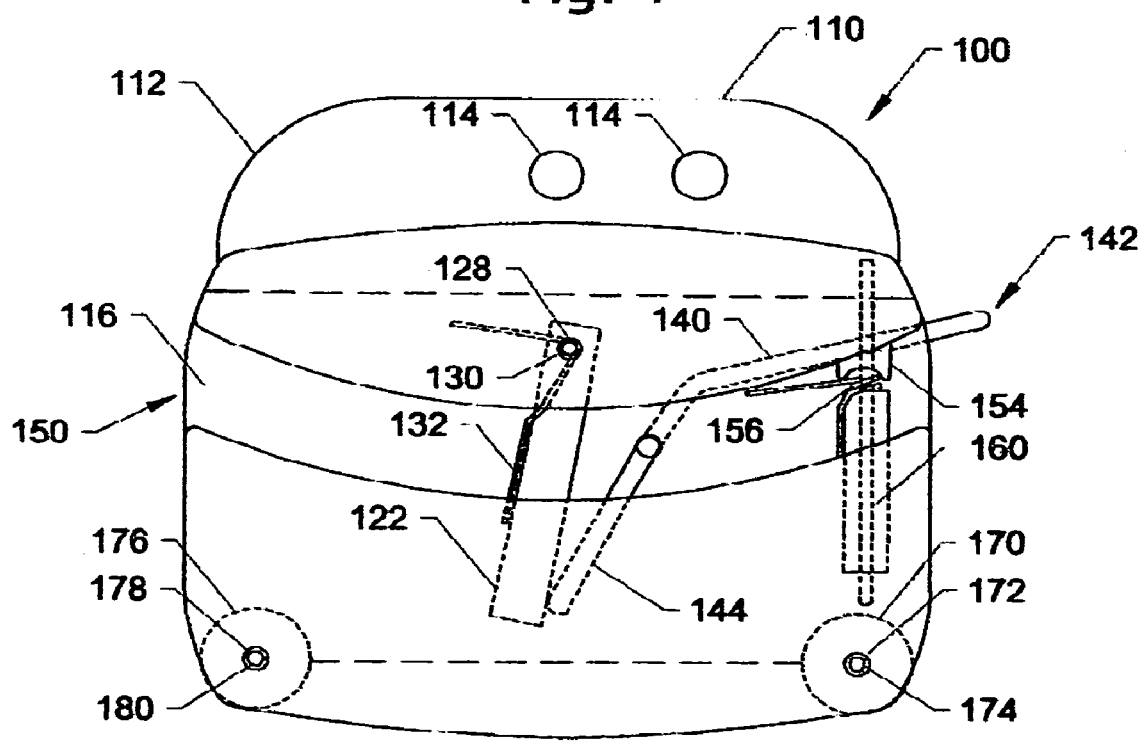
FIG. 5 is front view of the embodiment of FIG. 1.
Figure 6:
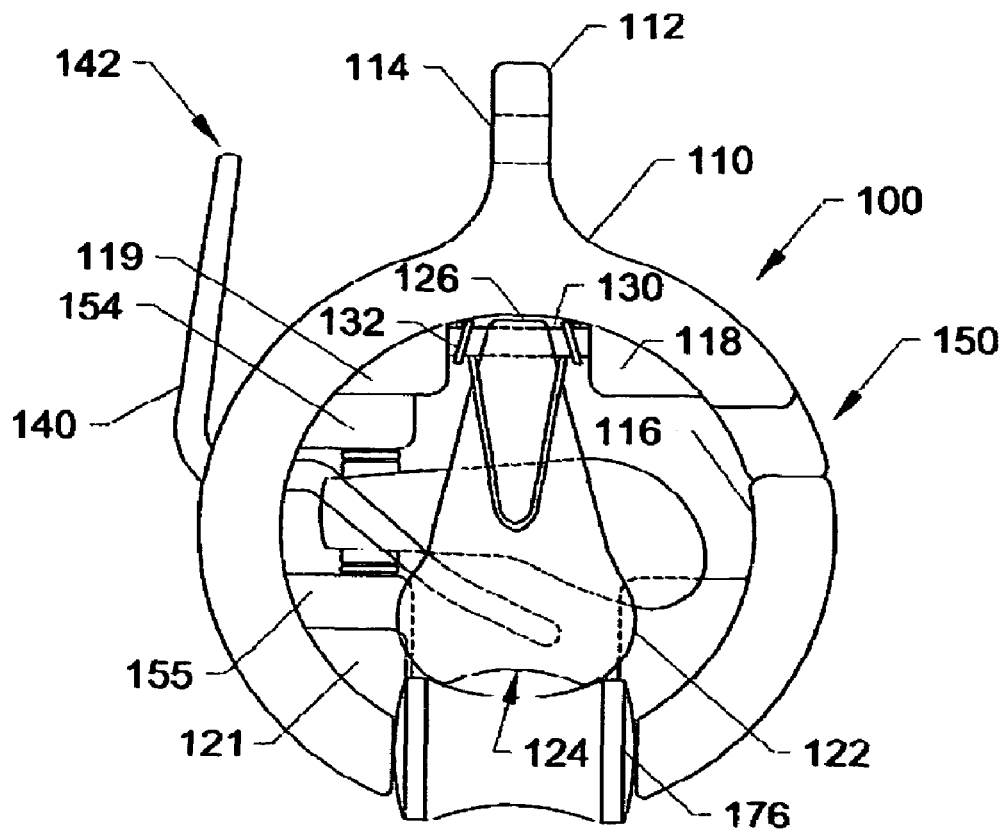
FIG. 6 is a left side view of the embodiment of FIG. 1.
Figure 7:
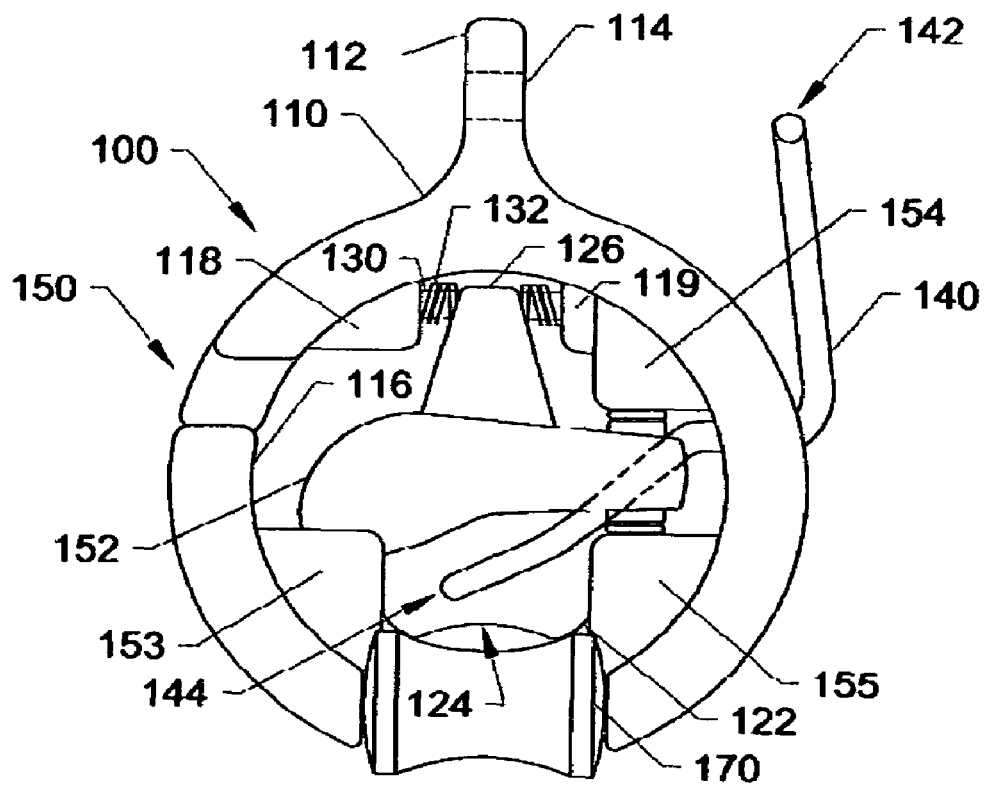
FIG. 7 is a right side view of the embodiment of FIG. 1.

FIG. 5 shows a side-entry slot extending along the entire length of the body 110. The slot enables sufficient clearance for a rope (L) to be passed to the interior of the body 110 without necessitating the end-feeding as taught in the prior-art devices. In one embodiment, the side-entry slot is generally curvilinear. This arcuately shaped slot 150 aids retention of a rope (L) as the rope feeds in or out of the pot-puller 100. However, other shaped slots are contemplated including a generally straight slit extending parallel to a longitudinal axis of the body.

Because the slot facilitates insertion, deployment, and use of a crab-pot or anchor rope, the optional release-assist handle 140 may be omitted from an alternate embodiment of the present invention.

Figure 4:
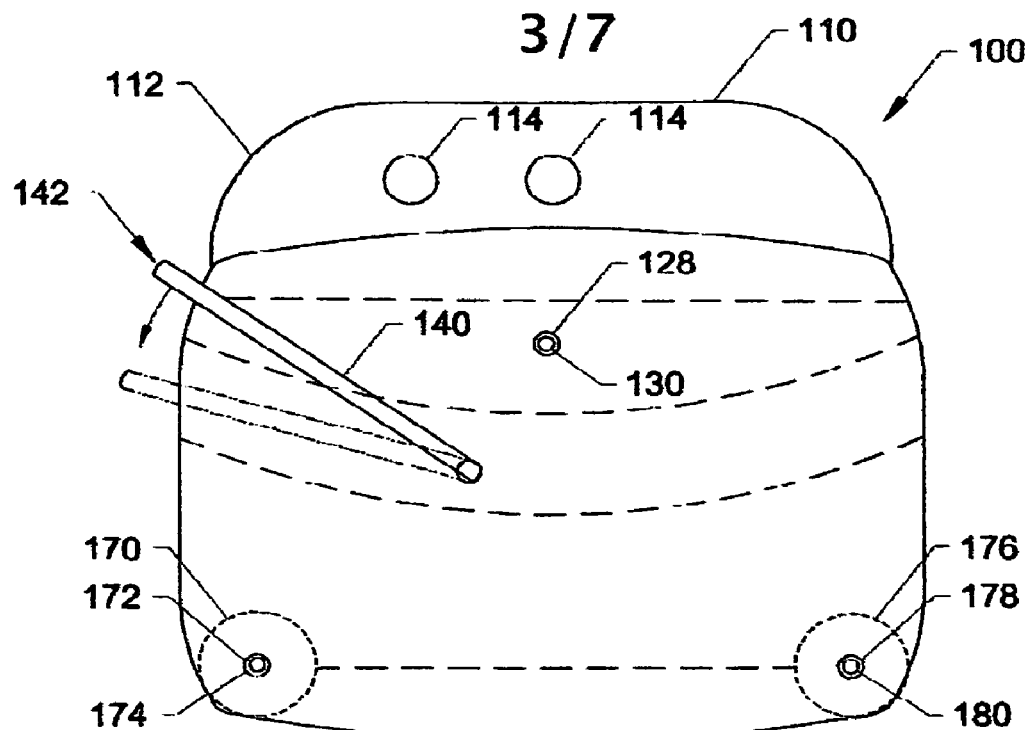
FIG. 4 is a back view of the embodiment of FIG. 1.

FIG. 4 illustrates a back view of the pot-puller 100 and includes multiple eyelets 114.

In an alternative embodiment of the present invention the rope-guide device or pot-puller 100 includes a cast aluminum cylindrical body 110 having a protruding handle 140.

In a preferred embodiment a rope-guiding device comprises a body member 110 configured generally as a hollow, barrel-shaped cylinder with open ends. At least one sidewall forms an interior portion having an open body first end and an oppositely arranged open body second end and the sidewall further comprising a through-slot extending from the first end to the second end, the slot being adapted to receive a rope that typically is used for hauling crab-pots, for example.

Figure 8:
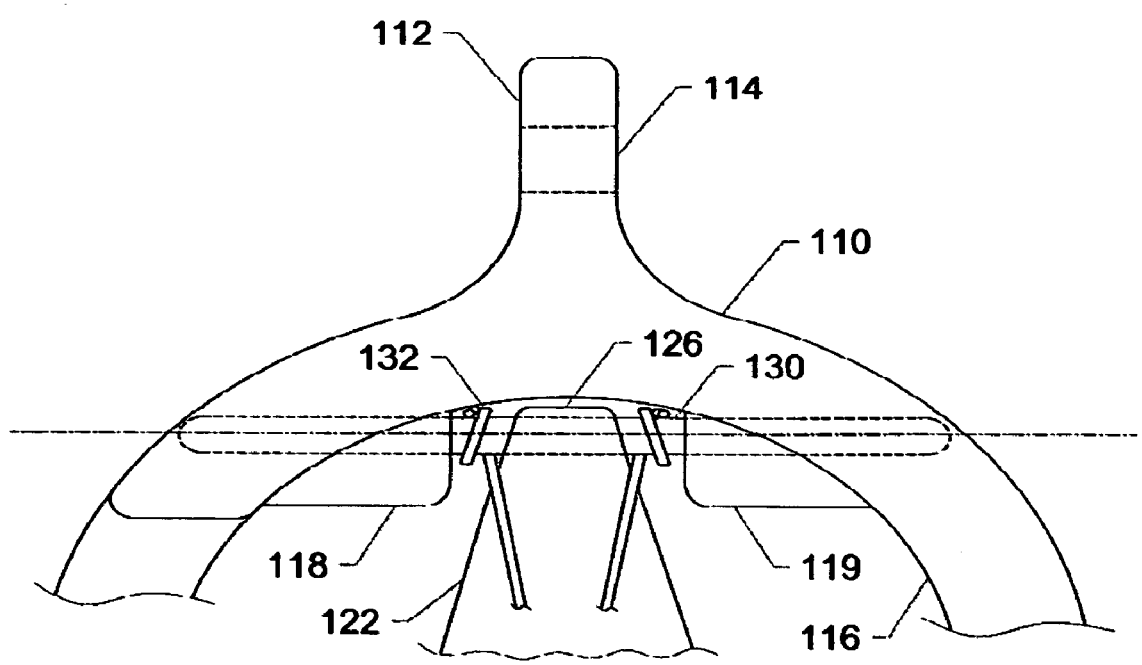
FIG. 8 is a partial left-side view of the embodiment of FIG. 1.
Figure 9:
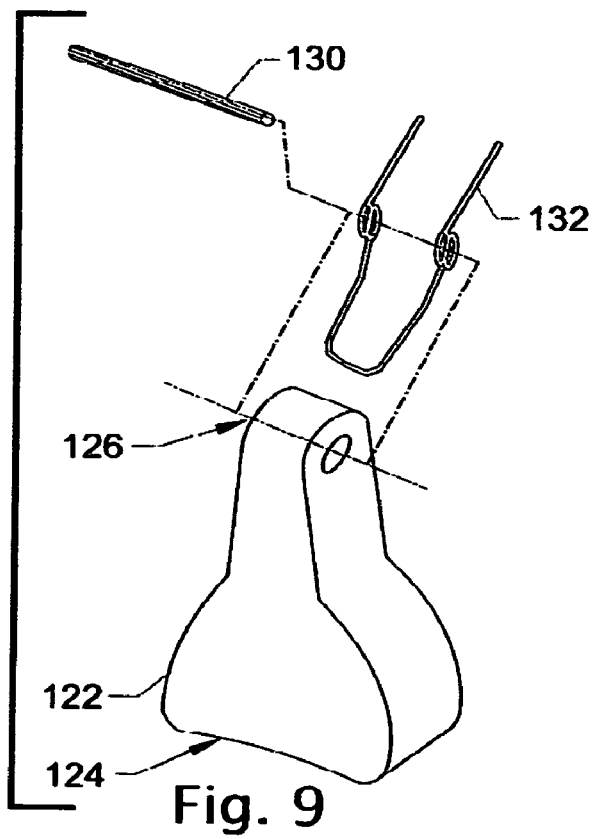
FIG. 9 is an assembly view of some components used in the embodiment of FIG. 8.

FIGS. 8 and 9 detail a locking mechanism extending from a first interior portion of the sidewall. The mechanism includes an anti-reversing lock-lever element 122 with a curved end portion 124 adapted to selectively engage a rope inserted in the device 100. Providing tension, a retaining element 132 adapts to releaseably engage lock-lever element from the rope.

The rope-guiding device further comprises a means for selectively coupling the body to a cord (the cord is used to couple the device to a buoy, dock, pier, or vessel for example). This means comprises a fin 112 with at least one through-hole 114 adapted to receive the cord.

The rope-guiding device 100 further includes an anti-reversing lock lever handle 142 adapted to releasably engage the lock mechanism 120 including level element 122. The handle 142 extends through the body member to an exterior portion of the body member.

The rope-guiding device further includes a first roll-pin assembly comprising a roller 170 and mounting pin 174, which adapts to fit in a through hole 172 at a first open end of the body member. A second roll-pin assembly arranged at the body second end includes a second roller 180 and second mounting pin 184 adapted to engage the respective through-hole 182 at the body second open end. The rollers 170 and 180 are further adapted to rotatably or slideably support the rope.

Figure 10:
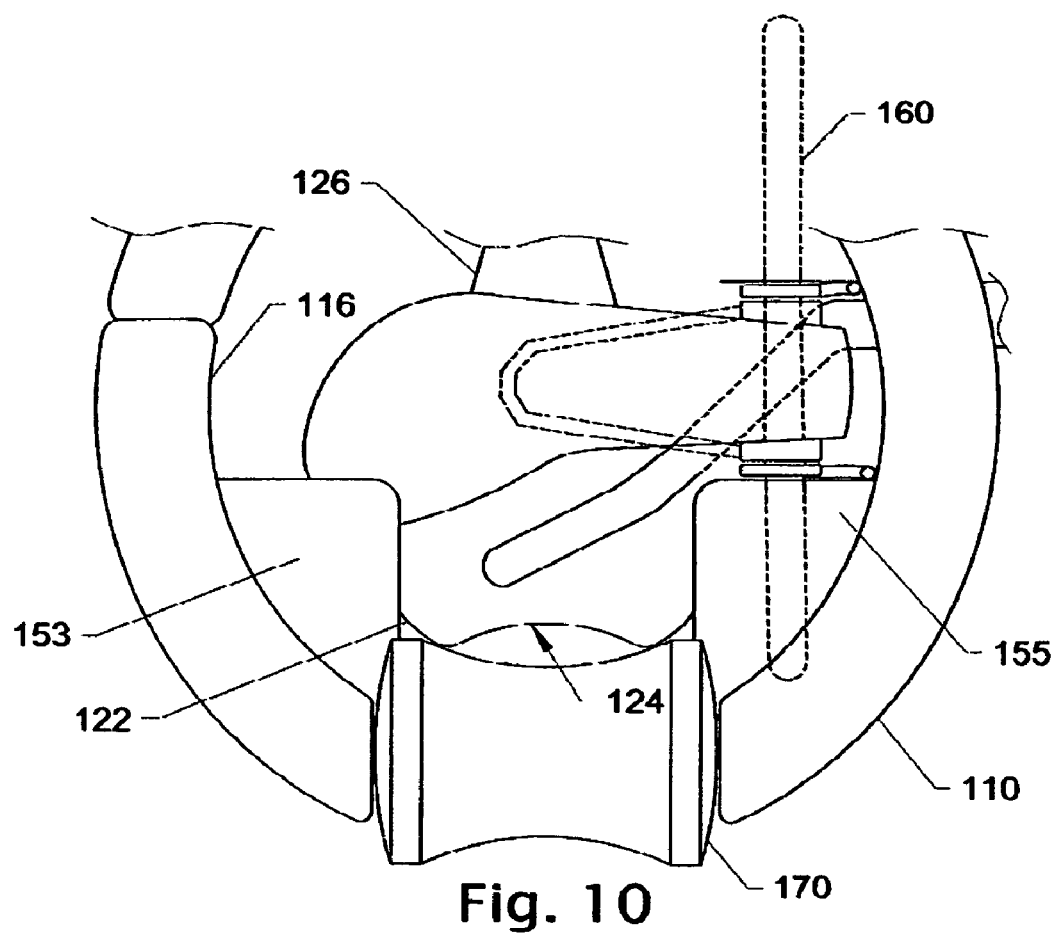
FIG. 10 is a partial right-side view of the embodiment of FIG. 1.
Figure 11:
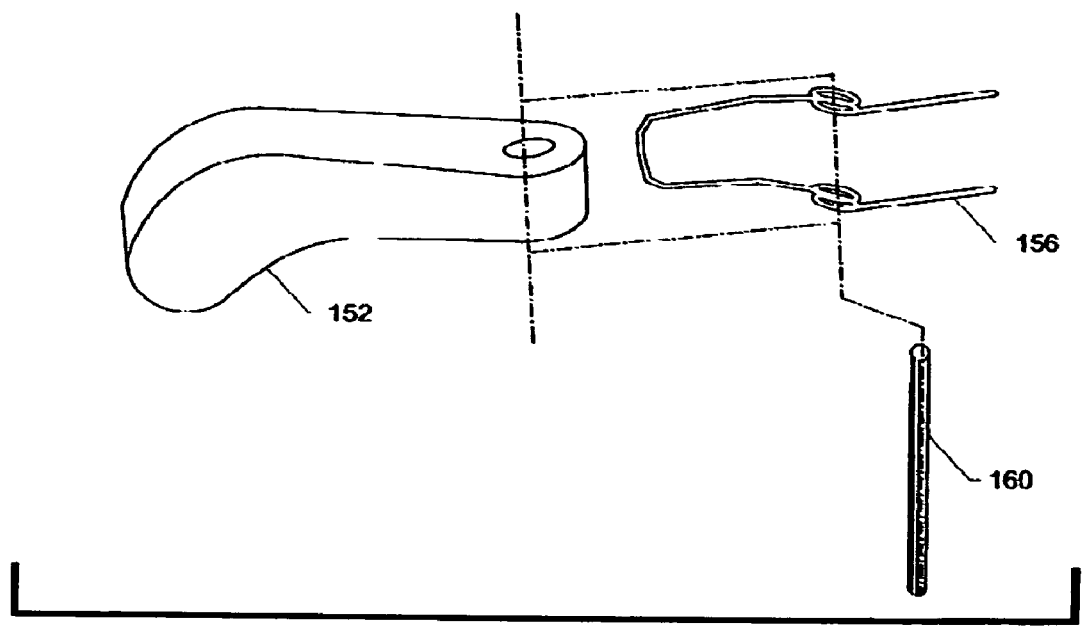
FIG. 11 is an assembly view of some components used in the embodiment of FIG. 10.

Also, as highlighted in FIGS. 10 and 11, a rope retention mechanism including arm 152 and tension device 156 mount to an interior portion of the body. The rope retention mechanism provides additional resistance on the rope to prevent undesired extraction of the rope from the device. This retention mechanism locates adjacent to the first open body end. An optional second retention device locates adjacent the opposite, second open body end.

Suitable materials for the pot-puller consist of any marine-grade material may be employed including cast or machined aluminum, bronze, or stainless steel, for example. Other marine-grade materials are contemplated including molded or extruded plastic or other polymers as would be understood in the art. Non marine-grade materials may be used in yet other embodiments, especial in embodiments intended for fresh water use, or for land use. Such materials might include steel, wood, or composites, for example. Additionally, the device may be coated with paint, or a plasticized coating. Such coatings may be of marine-grade, water impermeable, or otherwise configured as would be well understood by those practicing this art.

The foregoing description describes only a number of exemplar embodiments of the present invention; modifications, obvious to those skilled in the art, can be made to the specific embodiments without departing from the scope of the present invention. Therefore, the appended claims intend to capture, to the fullest extent permitted, all embodiments that fall within the true spirit and scope of the present invention.

I claim:

1. A rope-guide device for pulling crab pots having a rope attached thereto, the device comprising:
    a generally cylindrical body having a length greater than a diameter, the body comprising at least one sidewall having a thickness and arranged to form a hollow interior portion; a slot arranged along the entire length of the body and adapted to enable the rope to pass through the slot along a portion of the length of the rope; and
    a locking mechanism arranged on an interior portion of the cylindrical body, the locking mechanism comprising:
        a lock lever mounted to an interior portion of the sidewall;
        a tension device cooperating with the lock lever to exert pressure on an anti-reversing lock lever, the anti-reversing lock lever being pivotably mounted on a second interior portion of the cylindrical body; and
    an external release-assist handle comprising:
        a first, user-end comprising a portion extending tangentially outward from the cylindrical body and a second portion connected to the first portion, the second portion being aligned substantially parallel to the length of the cylindrical body and
        a second, lever-end portion extending from the user-end portion and passing through the sidewall to an interior portion whereby actuation of the user end selectively contacts a portion of the anti-reversing lock lever.

2. The rope-guide device of claim 1 further comprising a vertically aligned fin tapering from the generally cylindrical body, the fin further include at least one eyelet hole adapted to receive an attaching means for coupling the device to a buoy.

3. The rope-guiding device of claim 1 further comprising a roll-pin assembly arranged at the body first end and adapted to slideably support the rope.

4. The rope-guiding device of claim 1 further comprising a second roll-pin assembly arranged at the body second end and adapted to slideably support the rope.

5. The rope-guiding device of claim 1 wherein the slot further comprises a generally arcuate profile.

* * * * *